US008316516B2

(12) United States Patent
Hoehe et al.

(10) Patent No.: US 8,316,516 B2
(45) Date of Patent: Nov. 27, 2012

(54) MOUNTING DEVICE HAVING A METALLIC BASE PLATE WITH MULTIPLE HOOK-LIKE PROJECTIONS OBTAINED BY STAMPING OR LASER CUTTING AND BENDING

(75) Inventors: Kurt Hoehe, Langenau (DE); Bernd Ruess, Voehringen (DE); Georg Egloff, Weissenhorn (DE); Franz Schweiggart, Pfaffenhofen (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 1180 days.

(21) Appl. No.: 11/663,385

(22) PCT Filed: Oct. 5, 2005

(86) PCT No.: PCT/EP2005/010723
§ 371 (c)(1),
(2), (4) Date: Jan. 24, 2008

(87) PCT Pub. No.: WO2006/037624
PCT Pub. Date: Apr. 13, 2006

(65) Prior Publication Data
US 2008/0244878 A1 Oct. 9, 2008

(30) Foreign Application Priority Data
Oct. 5, 2004 (DE) .......................... 10 2004 048 464

(51) Int. Cl.
*A44B 18/00* (2006.01)
(52) U.S. Cl. ........................................................ 24/452
(58) Field of Classification Search ............ 24/442–452, 24/697.2, 693
See application file for complete search history.

(56) References Cited

U.S. PATENT DOCUMENTS

| 184,397 | A | | 11/1876 | Macumber |
| 3,011,226 | A | * | 12/1961 | Menge .......................... 411/466 |
| 3,899,803 | A | | 8/1975 | Brumlik |
| 3,964,133 | A | | 6/1976 | Wasserlein, Jr. |
| 4,251,970 | A | * | 2/1981 | Home ............................. 52/674 |
| 5,050,793 | A | * | 9/1991 | Graham, Jr. ............. 229/125.23 |
| 6,571,597 | B1 | | 6/2003 | Tucker |
| 7,121,417 | B2 | * | 10/2006 | Magnusson et al. .......... 211/103 |
| 7,390,057 | B2 | * | 6/2008 | Autterson ..................... 296/214 |
| 2003/0074771 | A1 | | 4/2003 | Duffy |
| 2004/0239080 | A1 | | 12/2004 | Berrahou et al. |
| 2006/0163222 | A1 | | 7/2006 | Dance et al. |
| 2006/0243017 | A1 | | 11/2006 | Jung et al. |

FOREIGN PATENT DOCUMENTS

| AT | 352 659 B | 10/1979 |
| DE | 199 12 736 A1 | 9/2000 |
| DE | 103 26 962 B3 | 11/2004 |
| DE | 103 47 409 A1 | 5/2005 |
| GB | 2 330 558 A | 4/1999 |
| SU | 494561 | 12/1975 |
| WO | WO 2004/028731 A1 | 4/2004 |
| WO | WO 2005/000633 A2 | 1/2005 |

* cited by examiner

*Primary Examiner* — James Brittain
(74) *Attorney, Agent, or Firm* — Marshall & Melhorn LLC

(57) ABSTRACT

The present invention relates to a mounting device having a metallic base plate, from which multiple projections project, and a method for manufacturing this mounting device. The mounting device may be obtained by cutting multiple hook preforms into the surface of the base plate while leaving at least one bending edge per hook preform. Furthermore, hook-like projections are manufactured by bending the hook preforms out of the base plate around the bending edge and possibly lateral protrusions are manufactured on the projections or these are twisted.

23 Claims, 11 Drawing Sheets

MOUNTING DEVICE HAVING A METALLIC BASE PLATE WITH MULTIPLE HOOK-LIKE PROJECTIONS OBTAINED BY STAMPING OR LASER CUTTING AND BENDING

BACKGROUND OF THE INVENTION

The present invention relates to a mounting device having a metallic base plate, from which multiple projections project, and a method for manufacturing such a mounting device.

In many industrial and other fields (e.g., construction, automobile construction, domestic use, etc.), it is typically necessary to fix metallic components or workpieces or connect them to other components. In this case, it is frequently desirable to produce the mounts and/or the connections in a simple way which may be performed rapidly, without special tools, such as welding or screwing tools, being necessary for fixing the fasteners. In the field of plastic components, such mounting is for instance achieved by using hook-and-loop closures as fasteners. However, these hook-and-loop closures are not employable for many uses, since they do not have the required durability and temperature stability and/or are not electrically conductive.

A method for manufacturing a metallic mounting device is already known from WO 2004/028731 A1. It is suggested that multiple oblong areas on the surface of a workpiece be melted using an electron beam, and the molten material be shifted along the longitudinal axis and then allowed to solidify again, so that a hole and an area projecting from the surface are formed in each case. In order to achieve a sufficient length of the projections, the method must be repeated multiple times. The workpiece is to be able to be connected to other workpieces by the resulting texturing of the surface, connections of workpieces made of metal and fiber composite material being cited as preferred. A device for generating an electron beam and a control device for controlling the beam are necessary for this method. In addition, the method must be repeated multiple times in order to obtain sufficiently large textures. The texturing of the surface according to this method is therefore relatively difficult and complex. High precision is also necessary in the manufacturing. Furthermore, it is not possible by means of the method to predefine specific shapes for the arrangement of the projections, which would be desirable for tailoring the adhesive properties of the textured surface of the workpiece to the material texture of the workpiece to be connected.

Because of the high cost and time pressure in production in industrial operations, particularly in the automobile industry, there is a need, as already noted above, for mounting devices, through which metallic components and devices in particular may be fixed and/or attached rapidly and easily, without additional tools or complex manufacturing methods being necessary. The mounting device is additionally to be durable and temperature-stable. Accordingly, the object of the present invention is to specify a mounting device of this type and a method for its manufacture, which ensures secure mounting of components in spite of relatively simple manufacturing, without additional tools being necessary for the fastening, and which is temperature-stable.

This object is achieved by the mounting device according to Claim 1 and the method according to Claim 20. Preferred embodiments and method variations are described in the particular subclaims. Furthermore, the present invention relates to the use of the mounting devices according to Claims 25 and 26.

BRIEF SUMMARY OF THE INVENTION

The present invention thus relates to a mounting device having a metallic base plate, from which multiple projections project, which are obtainable by hook preforms being cut into the surface of the metallic base plate, while leaving at least one bending edge per hook preform. As the next step, hook-like projections are manufactured, which is achieved by bending the hook preforms out of the base plate around the bending edge and possibly by manufacturing lateral protrusions on the bent-out projections and/or by twisting the upright hook preforms. The basic idea of the present invention is accordingly to cut multiple contours, through which the hook preforms are produced, into the metallic base plate in order to thus, in a second and possibly a third step, produce multiple projections, which are shaped like hooks, from the metallic base plate through bending. In this connection it is to be noted that the contours cut into the base plate are not arranged closed and at least one bending edge is left, around which the area of the metallic base plate enclosed by the cut-in contour is bent out of the surface of the base plate. The bending of the hook preforms is typically performed while maintaining predefined bending radii, in order to ensure that the metal does not tear on the surface in the area of the bending edge. Furthermore, the bending edge is to be understood as a bending line, which is not arranged exclusively as linear, but rather may also be arranged as curved or in another way. The radius is a function of the material thickness and is preferably more than 0.05 mm. The base plate and the part bent out of it may span any angle between 20° and 120°. Cutting contours into the base plate is to be understood to mean that the base plate is completely cut through in the area of the contours.

Due to the simple construction of the mounting device according to the present invention, it may be manufactured relatively uncomplicatedly and rapidly through simple metal processing technologies such as stamping, particularly roller stamping, cutting, and bending. Furthermore, due to the hook-like arrangement of the projections, in contrast to the essentially rounded projections of WO 2004/028731 A1, the capability of the mounting device to claw into a workpiece or component is increased and the retention force of the mounting device is therefore improved overall. A mounting device made completely of metal is obtained, which may be loaded with high tensile forces and has very good stability even at very high or very low temperatures. The mounting device according to the present invention may therefore be used even under extreme conditions as a "metallic hook-and-loop connector". The mounting device may be connected to a workpiece or component without further steps, such as welding or screwing, having to be performed. However, it is nonetheless possible to combine such additional fastening steps with the mounting device according to the present invention (e.g., preliminary mounting of components using the mounting device according to the present invention and subsequent, final fastening through welding or screwing).

The hook-like arrangement of the projections may be predefined either directly through the contour of the hook preform or possibly may be generated by manufacturing lateral protrusions on the projections which have already been bent out. The manufacturing of lateral protrusions on the projections may also be performed additionally with a projection arranged like a hook. Alternatively, the hook preform may be twisted around its longitudinal axis after being placed upright. The counterpart to be fastened may also hook onto this screw-like contour and may thus be held. Combinations of twisting with protrusions and/or barbs already predefined in the hook preform are also conceivable. Multiple, particularly two, neighboring hooks may be formed next to one another on one bending edge.

The contour of the hook preform may be designed arbitrarily in principle in all cases, as long as it is not closed. The arrangement of the hook-like projections may thus be tailored to the material composition of the workpiece to be connected by the mounting device and the retention force of the mounting device may be optimized. It is also possible for a partial area of a contour to delimit more than one hook preform simultaneously. Since multiple projections are arranged on the metallic base plate to obtain solid mounting, the length of the hook-like projections is generally between 1 and 20 mm, particularly between 2 and 10 mm. In individual cases, the projections may also be arranged as shorter or longer, however, in order to achieve optimum mounting tailored to the particular existing conditions.

In a preferred embodiment of the present invention, the lateral protrusions are manufactured by melting a partial area of the projections. The melting of the partial areas of the projections may be performed using all methods and devices known from the related art and suitable for this purpose. The melting is preferably performed using a laser beam. Furthermore, it is preferable to melt the upper front area of the bent-out projections, through which this area is expanded and therefore a lateral protrusion is formed on one or both sides.

As an alternative to this, it is preferable to manufacture the lateral protrusions by bending over a partial area of the projections. Therefore, the manufacturing of a hook-like shape of the bent-out projections may be performed easily.

In another preferred embodiment of the present invention, the hook-like projections are arranged on both sides of the metallic base plate. The mounting device may thus receive workpieces on both sides of the metallic base plate. In a further preferred embodiment, hook-like projections are only arranged on one side of the base plate, through which the number of hook-like projections per unit area, and therefore the retention force, is increased. In addition, the manufacturing is simplified.

The metallic base plate is preferably arranged as a thin metal sheet, made of steel, brass, aluminum, and its alloys, or copper and its alloys, and particularly spring steel, for example. This embodiment is especially suitable for cutting hook preforms and/or bending them. In principle, only a partial area of a metal sheet or a metal film may also be arranged as a base plate, the base plate preferably being positioned in the edge area of the metal sheet. To automate manufacturing, the metal sheet is expediently used in coil form. Multiple base plates positioned one after another and having projecting hooks are then shaped in the coil, and the individual mounting devices are cut out of the coil immediately afterward or only briefly before use. The metal coil is preferably arranged as an endless coil.

The hook-like projections are expediently arranged essentially uniform and distributed approximately evenly on the surface of the base plate. The uniform implementation simplifies the manufacturing of the mounting device and, in addition, a uniform force absorption capability of the mounting device is achieved.

In order to obtain a maximum number of the hook preforms per unit area and therefore increase the retention force, it is expedient to position the hook preforms nested one inside another, so that a partial area of a hook preform is positioned within an area that is enclosed by the contour of another hook preform. The first hook preform projects through the open area (bending edge) of the other hook preform into it.

In a further preferred embodiment, the hook preforms cut into the base plate have barbs on one or both sides. One or more barbs of different sizes and shapes may be arranged on one side. In this embodiment, hook-like projections may thus be produced merely by bending the hook preforms out of the base plate. In addition, it is nonetheless possible to bend over partial areas of these hook preforms before, during, or after the bending out, in order to thus produce further barbs which possibly have a different orientation than the barbs predefined by the hook preform. Furthermore, it is preferable for the hook preforms to be arranged as arrow-shaped or mushroom-shaped, the arrow or mushroom shape also able to be formed on only one side, i.e., as an arrow halved in the longitudinal direction, for example.

Instead of laterally cut barbs, it is also possible to manufacture a C-shaped barb through a round bend, similar to a walking stick handle.

In a further preferred embodiment, the hook preforms are arranged as V-shaped. It is advantageous in this case that the V-shape has a simple construction and is therefore easy to manufacture and the V-shaped hook preforms may be nested in one another especially well, since the bending edge is relatively large in comparison to the remainder of the contour and therefore there is sufficient space to allow another hook preform to project relatively far into the hook preform. Therefore, the number of the hook preforms per unit area may be maximized further. In this embodiment, the tips of the bent-out projection are typically bent over, e.g., after the hook preform is bent out of the base plate, through which a barb is produced.

The size and shape of the hook-like projections depend on the type of intended use. The projections are expediently arranged in such a way that they are capable of engaging in the counterpart to be attached. The size and shape of the barbs and the length of the body carrying the hook(s) are selected accordingly. The thickness of the metallic base plate—and therefore the thickness of the hooks bent out of the plate—expediently depends on the shear and tensile strain to be expected during and after the connection to the counterpart to be attached. This is also true for the other dimensions of the hooks. Unidirectional, bidirectional, and multidirectional arrangement is possible for all hook shapes and barbs.

The base plate clamps in the counterpart due to the projections provided with barbs and thus forms a stable connection. In order to increase the stability of the connection further, it is expedient for the surface of the counterpart to be arranged as textured, so that the largest possible attack area is offered for the hook-like projections. For example, perforated lattices, stretched sheet metal, and perforated sheet metal, each in a smooth or three-dimensional formation, perforated plates, accordion-folded sheet metal, possibly also having slots position transversely to the fold direction, and metal foams come into consideration as the counterpart. It is especially preferable to implement the counterpart as a knitted metal fabric, woven metal fabric, metal braid, or metal scrim. Structures which are constructed from multifilament wires, in which the individual filaments are guided with different tensions, are also suitable. In this context, chenille yarns and their woven fabrics, knitted fabrics, braids, or scrims made of wire are also cited. In these embodiments, the hook-like projections may clamp especially well in the counterpart. By using metal filaments to form the counterpart, the cohesion of the counterpart is ensured even in the event of high tensile or shear strain, which in turn increases the overall stability of the connection. In addition, the overall composite is distinguished by high temperature resistance, since it is made completely of metal, which not only allows use under extreme conditions, but rather also allows special application steps such as sterilization through heat or radiation. Furthermore, the metallic overall composite has electrical conductivity.

Another mounting device according to the present invention may also be used as the counterpart to be fastened. In this variation, the projections of the base plate, which are arranged with barbs, hook in one another and thus form a stable connection. In general, the connection between the base plate and the counterpart may be arranged as detachable or permanent in all variations described. A combination of sections having structures suitable for detachable connection and sections having structures suitable for permanent connection is also possible. This allows optimization of the preliminary fixing (removable connection) and subsequent final fastening (permanent sections). In general, the force which is required for detaching the connection behaves essentially inversely proportionally to the elasticity of the formfitting contours (e.g., barbs of the projections, area of the counterpart in which the barbs engage).

In order to ensure that the mounting device and the counterpart are positioned in previously defined positions to one another before the actual hooking of the hook-like projections in the counterpart, the mounting devices and the counterpart may have preliminary fixing elements which correspond to one another. The preliminary fixing elements are tailored to one another in such a way that the desired positioning of the counterpart and the mounting device to one another is achieved. The preliminary fixing elements are preferably arranged in such a way that they engage in one another.

The base plate may either be provided as a separate part or may be a part in a larger component. For example, the base plate may be a border section of a flat metallic component. The mounting device is thus produced in the component itself. In another variation, the separate mounting device is attached with its base plate to a carrier component. The carrier component is preferably made of metal, and the mounting device is attached to the carrier component in a suitable way, for example, using laser welding or another typical welding method. The entire area of the base plate does not have to rest on the carrier component in this case, but rather may project over it. In particular, the base plate may be made of a highly flexible material and form a strap. In this case, the base plate preferably has both mounting device and also counterpart at a distance to one another. The strap may thus, after being guided around an element of a part to be attached, be connected to itself or—if the counterpart is part of the base plate and not the strap—to the base plate. Hook-like projections are expediently arranged on the base plate of the mounting device on only one side, and the flat side of the base plate rests against the carrier component. In addition, in the embodiment in which the mounting device is arranged to engage in a counterpart, the counterpart may also be attached to a further carrier component or integrated therein.

In a further embodiment, the hooks are straightened using heat treatment, the effect of magnets, or the effect of electrical current before insertion into the counterpart and are returned into the hook shape after the insertion. Bimetallic materials are especially suitable for this purpose.

Furthermore, the object on which the present invention is based is achieved by the method for manufacturing the mounting device according to the present invention, in which multiple hook preforms are cut into the surface of the base plate while leaving at least one bending edge per hook preform and hook-like projections are produced by bending the hook preforms out of the base plate around the bending edges and possibly manufacturing lateral protrusions on the projections and/or twisting the projections around their longitudinal axis.

In a preferred method variation, the hook preforms cut into the base plate are manufactured using a laser beam. By using a laser beam, it is possible to cut even relatively small hook preforms into the metallic base plate precisely and thus achieve the most uniform possible arrangement of the hook preforms.

Alternatively, it is possible to manufacture the hook preforms cut into the base plate through stamping. This relatively simple metal processing technology simplifies and accelerates the manufacturing procedure, since multiple hook preforms may be stamped out at the same time.

Furthermore, it is preferable to perform the cutting of the hook preforms and the bending of the hook preforms in a rolling cutting process in a continuous operation or using a progressive die. If the protrusions are produced by bending over a partial area of the bent-out projections, this step may also be performed in this way. In this way, it is possible to execute the different steps of the method in one work cycle and/or by one die, and thus further optimize the overall manufacturing method.

Furthermore, it is also possible to manufacture the hook-and-loop connection in a double sheet, this means that two metal sheets pass through a die simultaneously, elevations and depressions being stamped, embossed, or bent out in both sheets simultaneously. These sheets subsequently form the hook-and-loop pair.

If protrusions are produced by melting a partial area of the projections, a laser is preferably used for the melting. If the laser is also used for cutting the outer contours of the hook preforms, no additional tool is necessary for the melting step. Laser radiation may also be used for bending the hooks. Instead of laser bending, the hooks may also be produced using thermal bending. Both laser bending and also thermal bending are especially suitable if only low piece counts are to be manufactured.

Preferred fields of application of all mounting devices described according to the present invention are the fastening and mounting of components and devices in construction, in medical technology, in domestic use, and in metal construction. In metal construction, the mounting and fastening of metal parts in the automobile sector is especially preferred. The mounting device according to the present invention is especially used there for fastening heat shields, sound insulation, and engine encapsulations, and for vibration damping of metallic connections. In the present invention, vibration dampening is reached by a non-rigid arrangement which buffers vibrations and protects the metallic connections from stress caused, for example, by shock absorption.

Furthermore, the mounting devices according to the present invention may be used for fastening components to heaters and stoves and for fastening the sheathing of pipes. Because the mounting devices according to the present invention are made of metal, they are also especially suitable for being used in the field of component mounts and component connections for high temperature or low temperature applications and for conducting electrical current.

BRIEF DESCRIPTION OF THE DRAWINGS

In the following, the present invention will be described in greater detail on the basis of exemplary embodiments illustrated in the drawing. These examples are merely intended for explanation, however. The present invention is not restricted thereto.

FIG. 14c schematically shows a sectional perspective view of the mounting device of FIG. 14b engaged with the counterpart of FIG. 14a;

In the different embodiments of the present invention illustrated in the figures, identical components are provided with identical reference numbers.

DETAILED DESCRIPTION OF THE INVENTION

Figure 1:
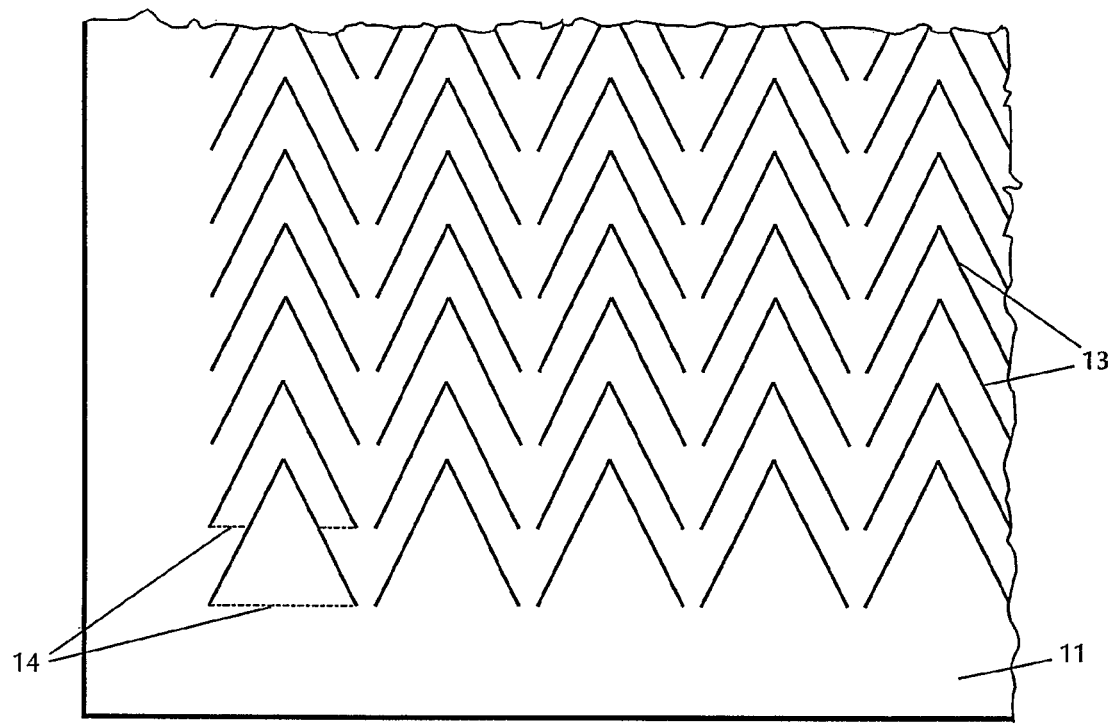
FIG. 1 schematically shows a partial top view of a metallic base plate having cut-in hook preforms.

FIG. 1 shows a partial top view of the base plate 11 of a mounting device according to the present invention having hook preforms 13 cut therein. The hook preforms 13 are arranged V-shaped and nested in one another, so that a relatively high density of hook preforms 13 per unit area is achieved. The V-shaped hook preforms 13 are arranged symmetrically and are nested in one another in such a way that their tips are positioned lying on a straight line within a row. The dashed lines present in two of the hook preforms 13 indicate the bending edges 14, around which the hook preforms 13 are bent in order to thus produce hook-like projections. The bending edge 14 of the hook preform 13 in the lowermost row is arranged as continuous, while the bending edge 14 of the hook preform 13 in the second row is interrupted from below by the nesting of the hook preform 13.

Figure 2:
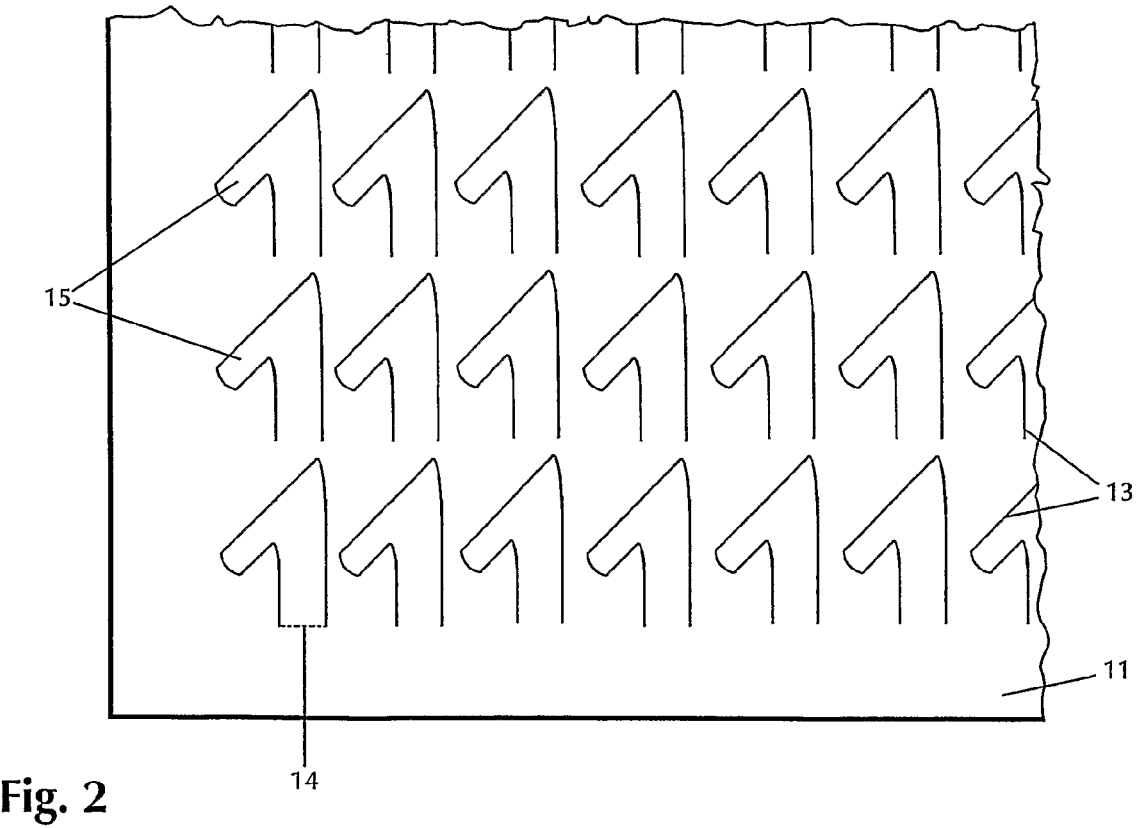
FIG. 2 schematically shows a partial top view of a further metallic base plate having different hook preforms.

FIG. 2 also shows a partial top view of a metallic base plate 11 of a mounting device according to the present invention having hook preforms 13 cut therein. The hook preforms 13 have a vertically oriented, approximately rectangular main body, on whose upper end a barb 15 is arranged, which extends beveled downward and to the left. The lower, horizontal edge of the main body is not cut into the base plate 11 and is used as the bending edge 14 for bending the hook preform 13 out of the base plate 11. Furthermore, the hook preforms 13 are oriented uniformly and distributed evenly on the surface of the metallic base plate 11.

Figure 3:
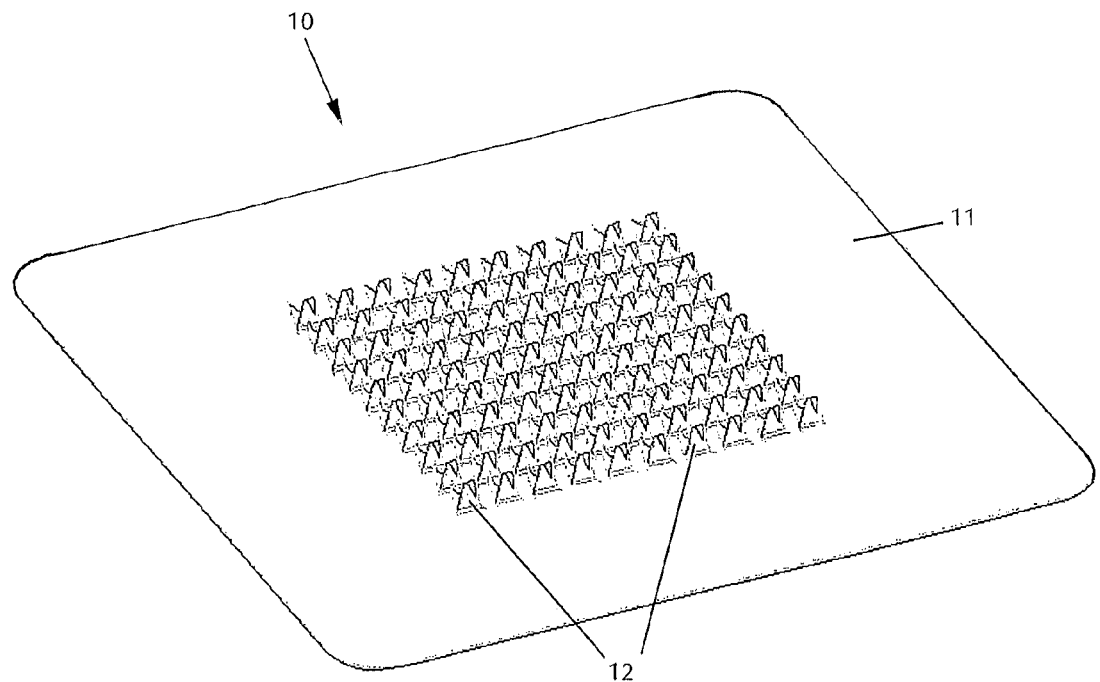
FIG. 3 schematically shows a perspective top view of a mounting device according to the present invention.

FIG. 3 shows a mounting device 10 according to the present invention. Hook-like projections 12 are bent out on one side of the metallic base plate 11. The hook-like projections 12 are based on the V-shaped hook preforms from FIG. 1. Furthermore, the hook-like projections 12 are oriented uniformly and are distributed evenly on the surface of the metallic base plate 11, leaving a peripheral border.

Figure 4:
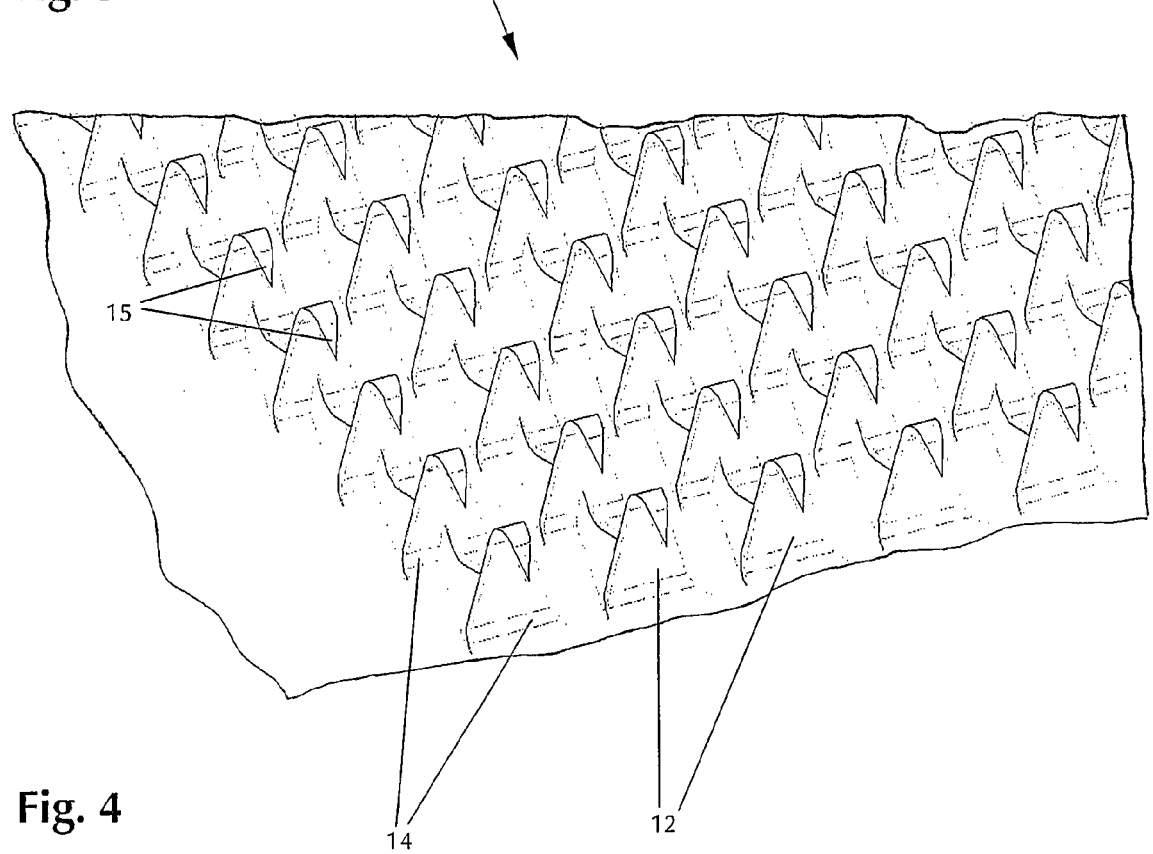
FIG. 4 schematically shows a partial view of the mounting device from FIG. 3.

FIG. 4 shows a partial view of the mounting device 10 from FIG. 3. It may be seen that the tips of the hook-like projections 12 are bent over and form barbs 15. The hook-like projections 12 are bent around the bending edges 14 in such a way that they stand approximately vertically on the base plate.

Figure 5:
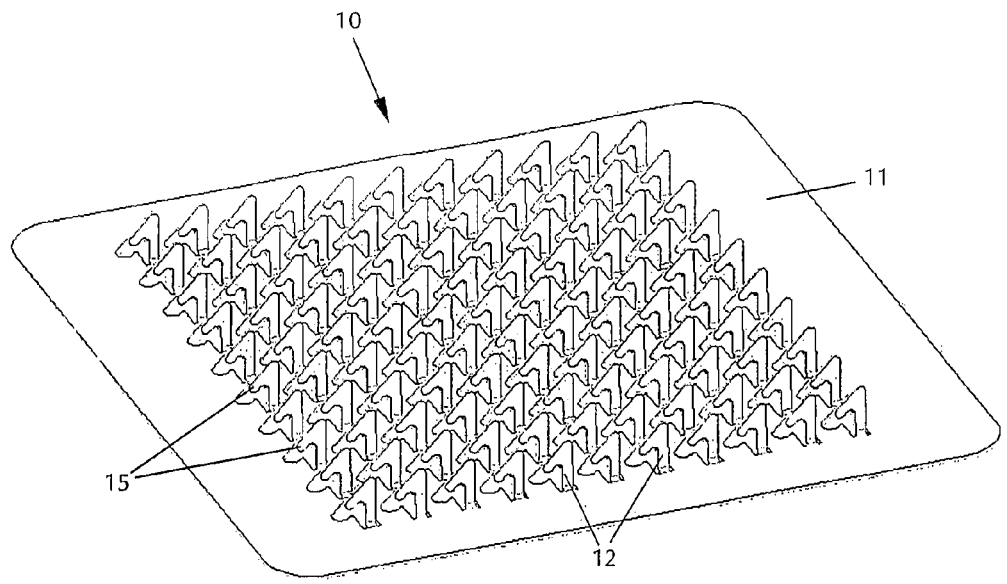
FIG. 5 schematically shows a perspective top view of a further embodiment variation of a mounting device according to the present invention.

FIG. 5 shows a perspective view of a further mounting device 10 according to the present invention having hook-like projections 12 bent out of the metallic base plate 11, whose shape is similar to that of the hook preforms from FIG. 2. The hook-like projections 12 have barbs 15 and are uniformly oriented and distributed evenly over the surface of the base plate 11. In this mounting device 10 as well, a peripheral border is left on the base plate 11, which may later be used for fastening to a larger component, for example.

Figure 6:
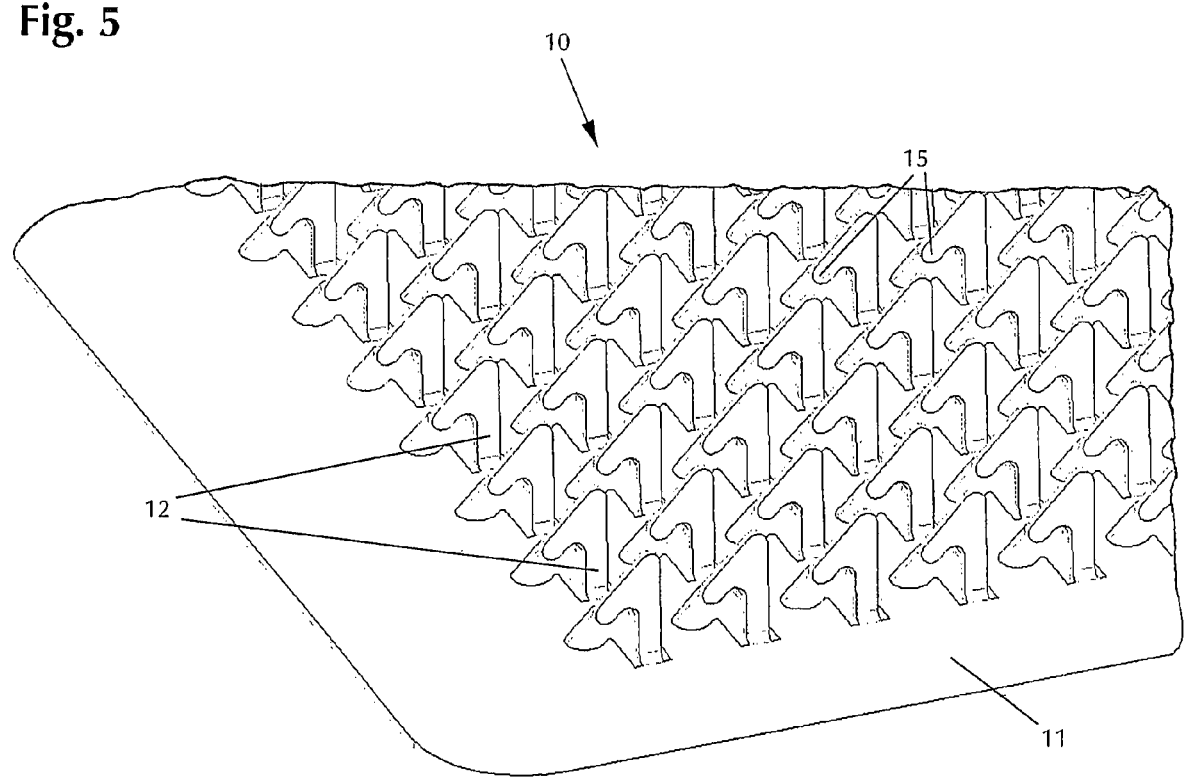
FIG. 6 schematically shows a partial view of the mounting device from FIG. 5.

FIG. 6 shows a partial view of the mounting device 10 from FIG. 5.

Figure 7:
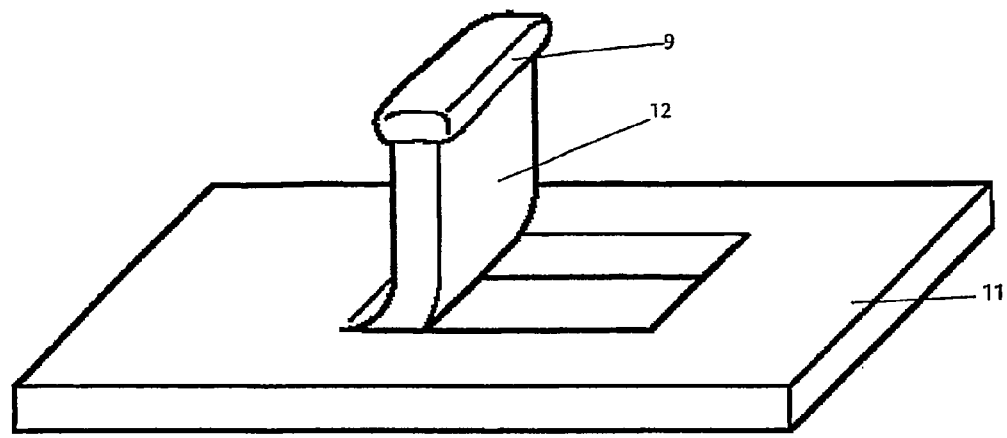
FIG. 7 schematically shows a perspective view of the detail of a metallic base plate having a projection, having a mushroom head, bent out of it.

FIG. 7 is a perspective view of a detail of a metallic base plate 11 having a hook-like projection 12 bent out of it. The upper, front area of the hook-like projection 12 has been melted using a laser beam and therefore forms protrusions projecting on both sides above the upper end of the projection 12 in the form of a mushroom-like head 9. Due to the melting, the mushroom-like head 9 has broader dimensions on all sides than the actual projection 12, so that the mushroom-like head 9 may hook into a counterpart. Except for the mushroom-like head 9, the projection 12 is arranged as rectangular.

Figure 8:
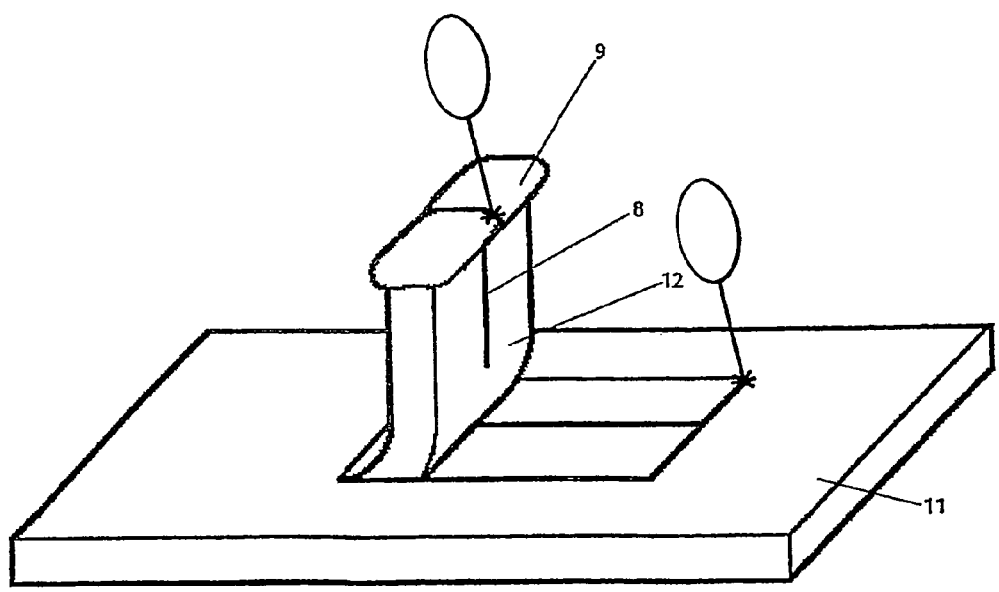
FIG. 8 schematically shows the view from FIG. 7 having a slot cut into the upper area of the projection 12.

FIG. 8 shows a refinement of the embodiment from FIG. 7, wherein a vertically oriented slot 8 is cut into the hook-like projection 12 starting from the mushroom-like head 9. The slot 8 is positioned approximately centrally. The upper area of the hook-like projection 12 is subdivided into a left and a right section by the slot 8, which may be bent apart (see FIG. 16). The upright upper end of the projection 12, which is then V-shaped, is a combination of bending over and thickened areas, in order to form barbs in the form of lateral protrusions on the projection 12. By bending both sections, the ability of the hook-like projections 12 to clamp in a counterpart is increased further and the force absorption capability by the mounting device is therefore generally improved.

Figure 9:
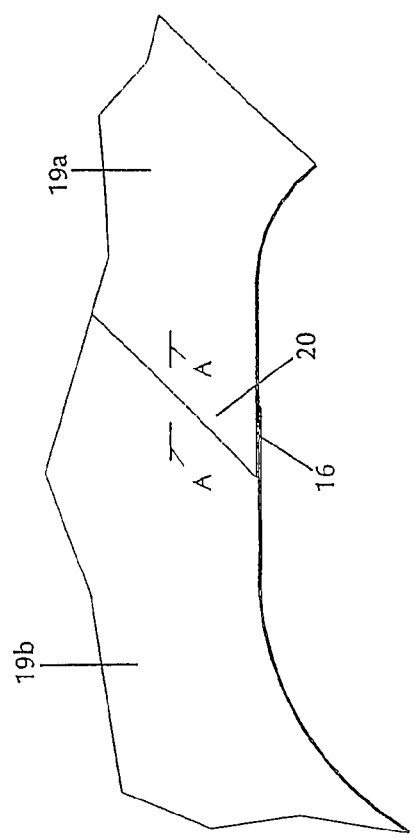
FIG. 9 schematically shows a perspective view of two components connected to one another by the mounting device according to the present invention.

FIG. 9 shows two flat metal components 19a and 19b. A partial area 20 of the component 19a overlaps a part of the component 19b. A mounting device according to the present invention is attached to the bottom of the partial area 20 of the component 19a, through which the components 19a, 19b are connected to one another. The part of the component 19b overlapped by the component 19a is arranged as a counterpart 16, in which the mounting device engages.

Figure 10:
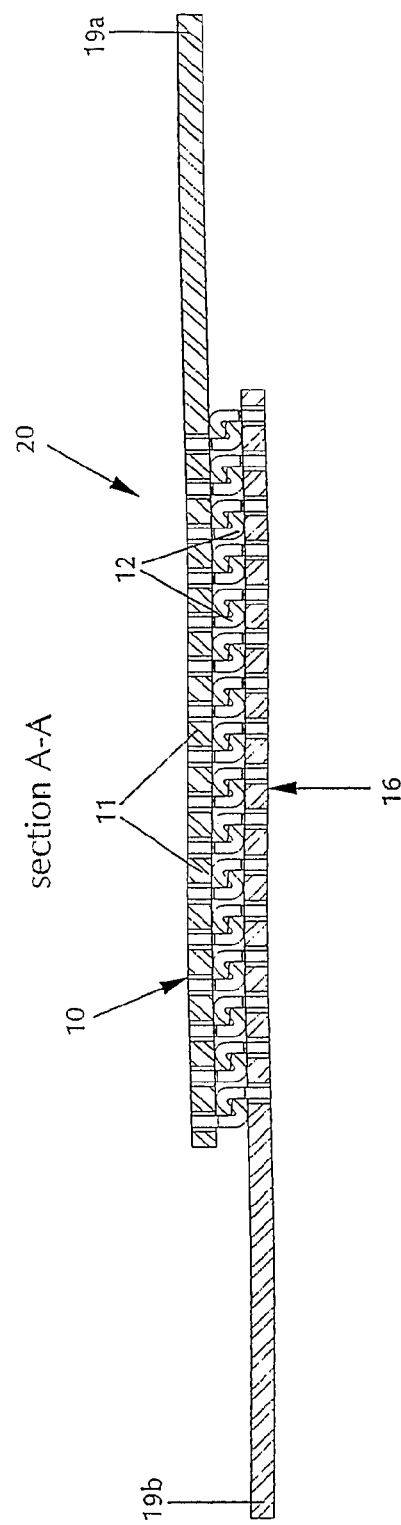
FIG. 10 schematically shows a sectional side view of a mounting device engaged with a counterpart along section A-A from FIG. 9.

FIG. 10 shows a sectional side view along section line A-A from FIG. 9. A mounting device 10 according to the present invention is arranged on the bottom of the overlap area 20 of the component 19a, which has hook-like projections 12 that project downward. In the embodiment illustrated in this figure, the counterpart 16 arranged on the component 19b is arranged analogously and mirror-symmetrically to the mounting device 10 arranged on the component 19a. The hook-like projections 12 of the mounting device 10 and the counterpart 16 engage in one another and thus connect the two components 19a and 19b without further fasteners being necessary.

Figure 11:
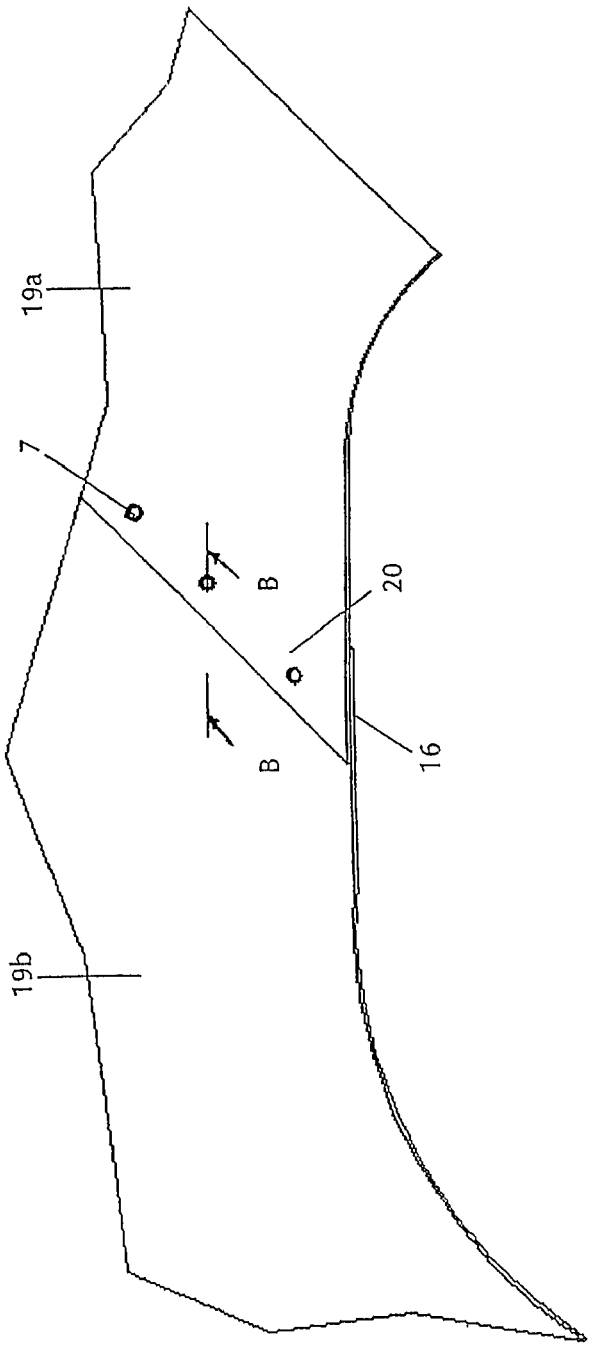
FIG. 11 schematically shows a perspective view of two components connected to one another by the mounting device according to the present invention having preliminary fixing elements.

FIG. 11 shows two flat metal components 19a and 19b, similar to those from FIG. 9. In contrast to FIG. 9, in the illustration in FIG. 11, punctually arranged preliminary fixing elements 7 are positioned in the partial area 20 of the component 19. The preliminary fixing elements 7 comprise corresponding fixing elements, which engage in one another, in the metal components 19a and 19b.

Figure 12:
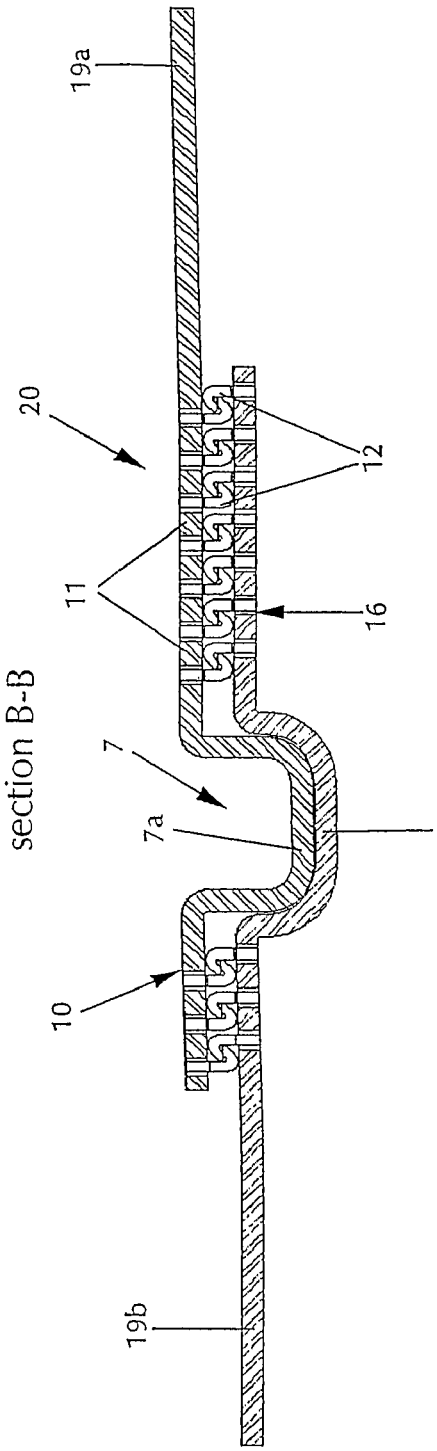
FIG. 12 schematically shows a sectional side view of a mounting device engaged with a counterpart along section B-B from FIG. 11.

FIG. 12 shows a sectional side view along the section line B-B from FIG. 11. It may be seen that cup-like depressions 7a and 7b, which correspond to one another and engage in one another, are arranged within the overlap area 20 both in the component 19a and also in the component 19b, which together form the preliminary fixing element 7. The depths of the cup-like depressions 7a and 7b are selected in such a way that a distance sufficient for mutual hooking of the hook-like projections 12 remains between the flat metal components 19a and 19b.

Figure 13:
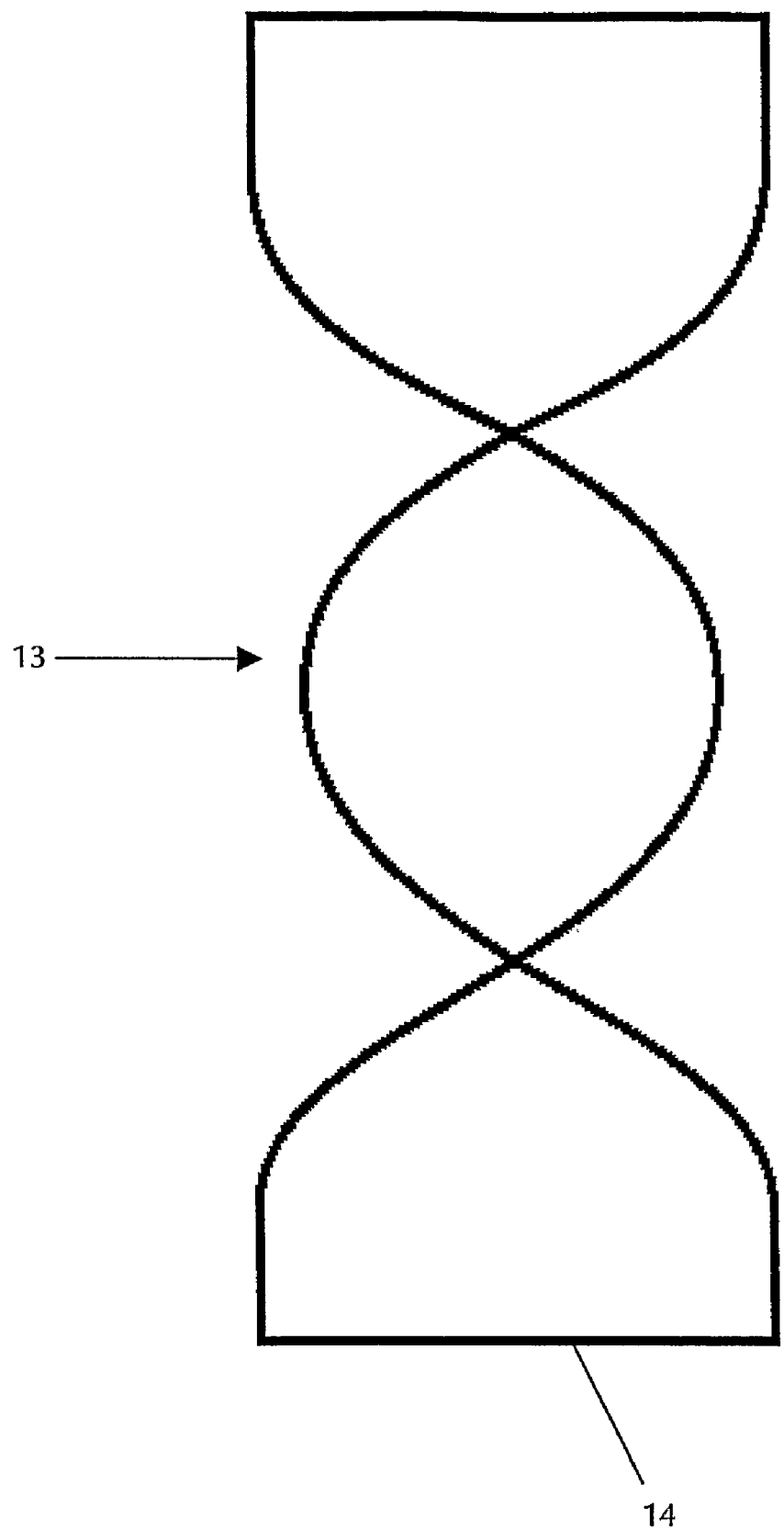
FIG. 13 schematically shows a side view of a hook-like projection of a mounting device according to the invention in a simplified illustration.

FIG. 13 shows in a simplified illustration a further variation of a hook-like projection 12, which can be employed in a mounting device according to the invention, which for example was described in FIGS. 1 through 6, instead of the projections 12 shown therein. Initially, a hook preform is cut as a rectangular contour in the base plate, similar to FIGS. 7 and 8, and the projection 12 is then bent out of the base plate around the bending edge 14. Subsequently, the projection 12 is twisted around its longitudinal axis so that it results in a screw-like form. The counterpart that has to be attached can hook onto this screw contour.

Figure 14A:
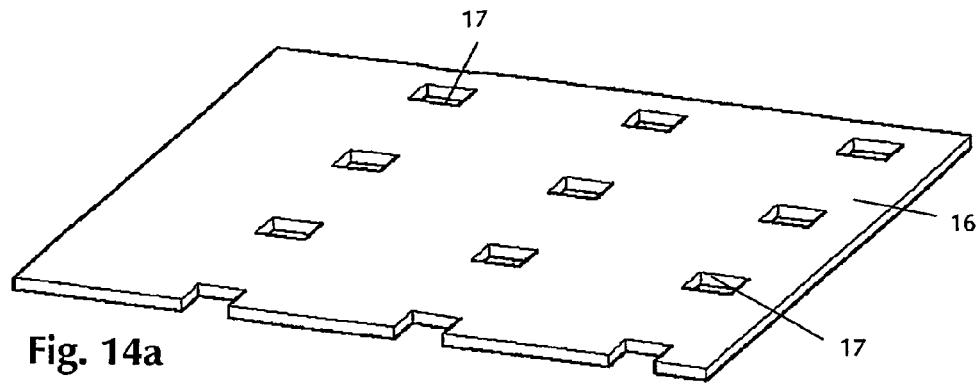
FIG. 14a schematically shows a sectional perspective view of another embodiment of a counterpart for the mounting device.
Figure 14B:
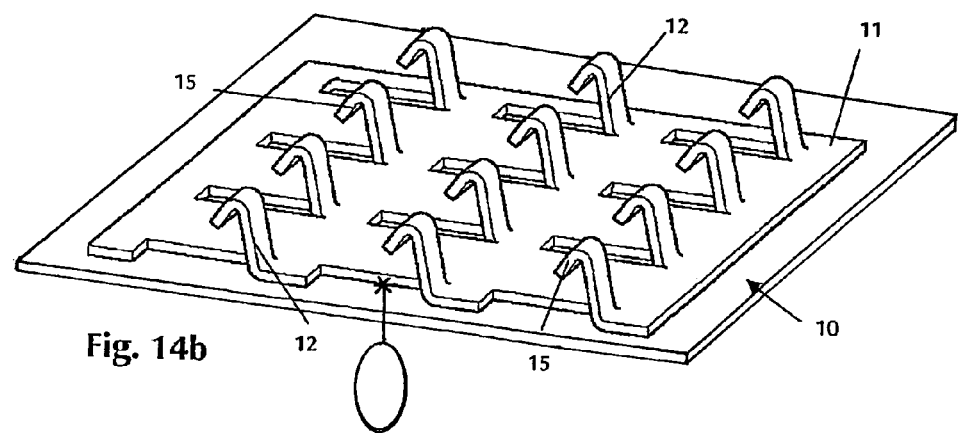
FIG. 14b schematically shows a sectional perspective view of another embodiment of the mounting device.
Figure 14C:
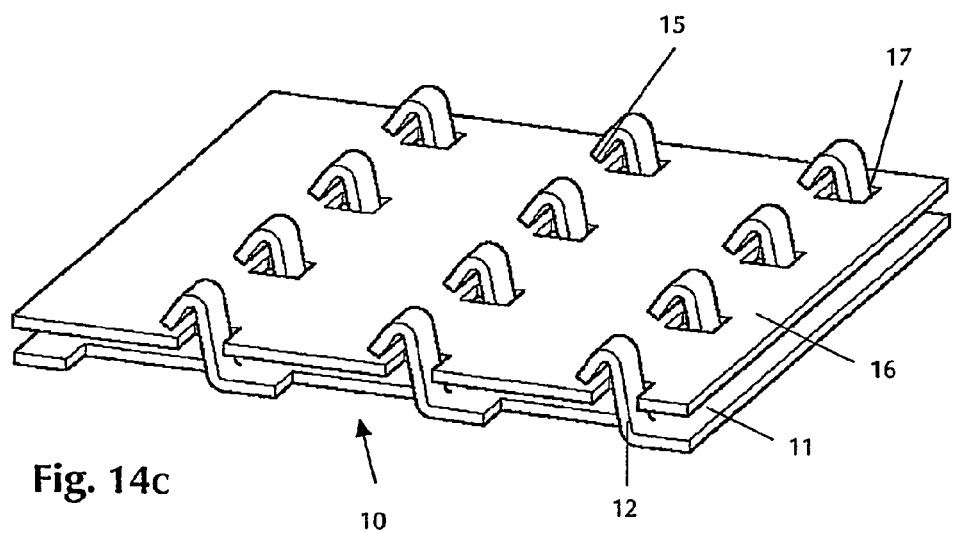

FIGS. 14a to 14c show sectional perspective views of a further embodiment of a counterpart 16 and a further embodiment of a mounting device 10 arranged to engage with the counterpart 16. The counterpart 16 consists of a metallic plate, in which a multitude of rectangular through holes 17 is provided. The through holes 17 are oriented in rows in the longitudinal direction of the counterpart 16 as well as in its transverse direction. The mounting device 10 comprises a metallic base plate 11 out of which hook-like projections 12 are bent out. The projections 12 are bent out only to one side of the metallic base plate 11. In addition, the hook-like projections 12 have a rectangular base while their tips are bent over in order to form barbs 15. They are bent out of the metallic base plate 11 about an angle of approximately 75°. The barbs 15 are bent over with respect to the main part of the hook-like projections 12 about an angle of approximately 135°. Furthermore, the hook-like projections 12 are oriented uniformly and are distributed evenly on the surface of the metallic base plate 11. The length of the rectangular through holes 17 is arranged such that they are slightly shorter than the greatest spread between the barbs 15 and the main parts of the hook-like projection 12. Thus, when the hook-like projections 12 are being inserted in the through holes 17, the barbs 15 and the main parts of the hook-like projections 12 are slightly pressed towards each other during the insertion. Once the barbs 15 have passed the through holes 17, the barbs 15 and the main parts of the hook-like projections 12 are no longer pressed together and assume their initial positions. Hence, the spread between the barbs 15 and the main parts of the hook-like projections 12 is again greater than the length of the through holes 15 so that the barbs 15 hook on the metallic base plate 11 and the mounting device 10 can no longer be disengaged from the counterpart 16. Therefore, the mounting device 10 and the counterpart 16 shown in FIGS. 14a to 14c form a solid connection.

Figure 15:
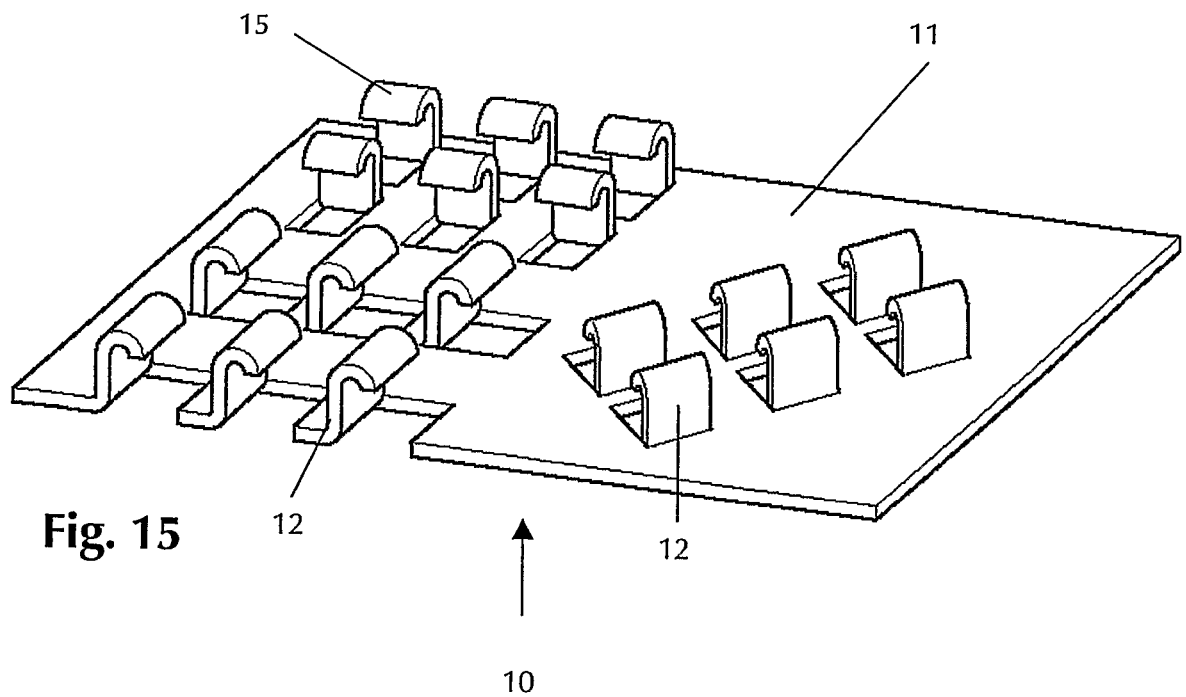
FIG. 15 schematically shows a perspective view of a further embodiment of a mounting device with hook-like projections that are oriented in different directions.

FIG. 15 shows a perspective view of a base plate 11 from which a total of eighteen projections 12 project. The projections 12 are bent out only to one side of the base plate 11. The base plate 11 has a rectangular base. Six projections 12 are oriented in a longitudinal direction of the base plate 11, another six projections 12 are oriented in a transverse direction of the base plate 11 and the remainder of the projections 12 is oriented in a diagonal direction of the base plate 11. Therefore, the projections 12 of the base plate 11 show a multidirectional arrangement. This variation in the alignment of the projections 12 can result in firmer attachments between the mounting device 10 and the counterpart because movements of the counterpart or the mounting device in a direction in which a part of the projections are orientated does not cause the other projections 12 to disengage from the counterpart. Further, when a certain section of projections of a base plate is aligned in a different direction then the rest of the projections, this section can serve as a starting point for disengaging the mounting device from the counterpart, therefore facilitating the process of disengagement.

Figure 16:
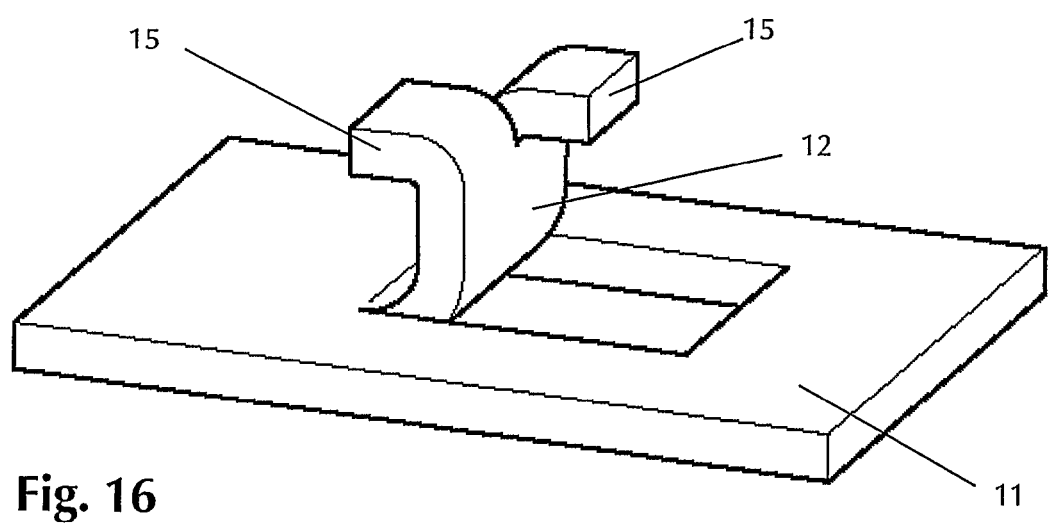
FIG. 16 schematically shows a perspective view of a detail of a metallic base plate having a projection with two opposing barbs.

FIG. 16 shows a refinement of the embodiment from FIG. 8. The upper area of the projection 12 is subdivided in a left and a right section, separated by the vertically oriented slot that was cut into the hook-like projection 12. The left and right sections are bent out of the plane of the projection 12 to form two barbs 15. The two barbs 15 are bent out to different sides of the plane of the projection 12, each about an angle of approximately 90°. Therefore, the barbs 15 are projecting from different sides of the projection 12.

Figure 17:
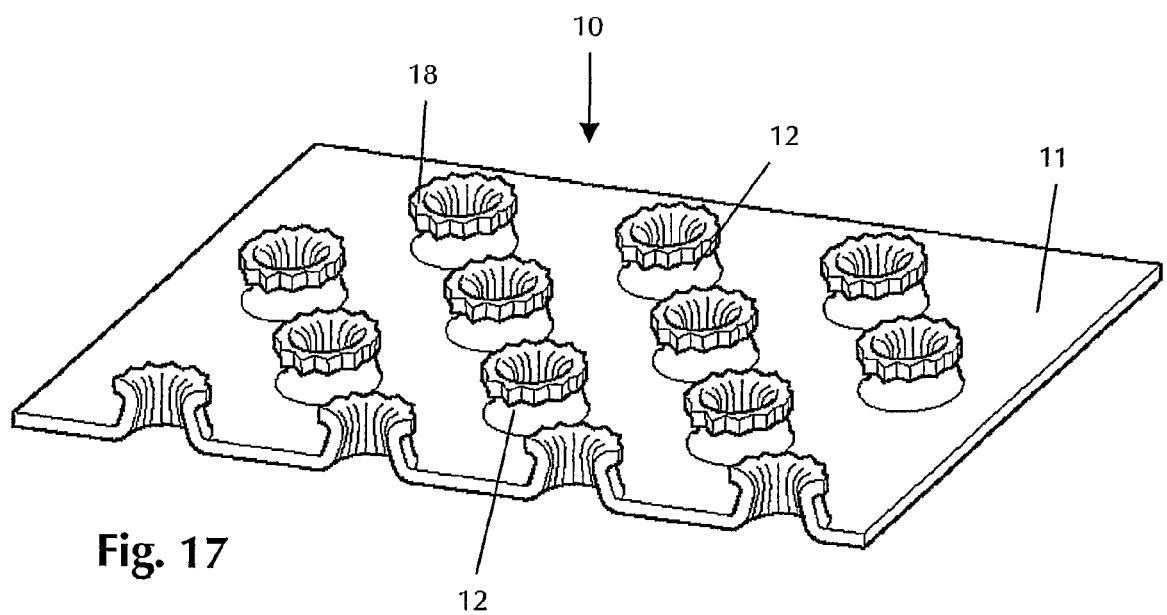
FIG. 17 schematically shows a sectional perspective view of a further embodiment of a mounting device having multiple hook-like projections with annular heads.

FIG. 17 shows a perspective view of yet another embodiment of the mounting device 10. The mounting device 10 comprises a base plate 11 from which to one side multiple uniformly distributed projections 12 project. The hook-like projections 12 have a conical basic shape which tapers from the base plate 11 towards its top portion. The heads 18 of the hook-like projections 12 are formed ring-like, resembling annular gears that protrude from the projections 12 outside and are oriented approximately parallel to the base plate 11. The hook-like projections 12 are produced by piercing the base plate 11 from one side to the other. By piercing the base plate 11, projections of conical shape are generated around the punctuation holes on one side of the base plate 11. Subsequent to the piercing of the base plate 11, the generated projections are leveled off in order to generate the annular heads 18.

Figure 18:
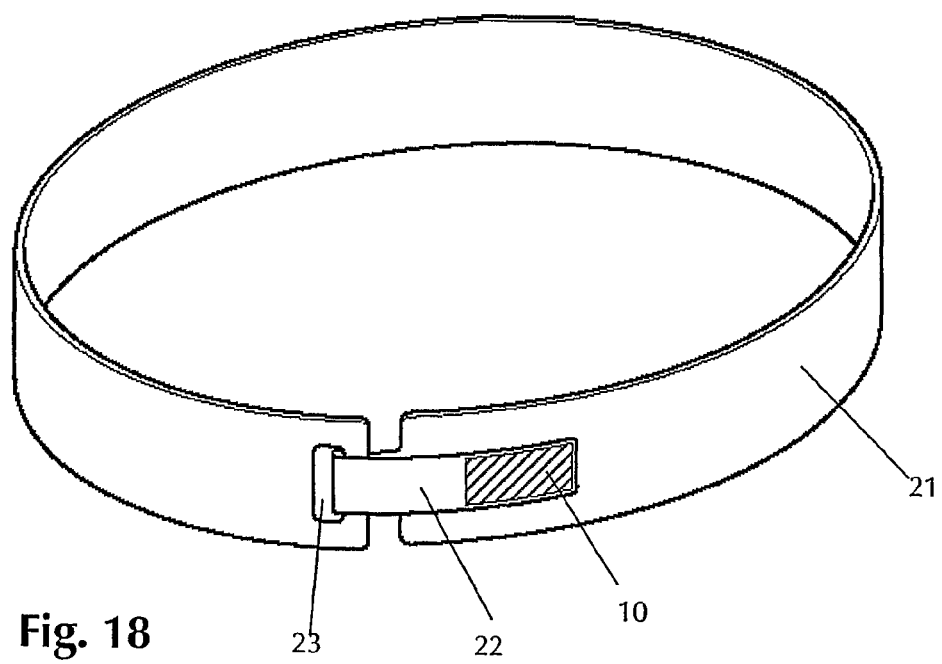
FIG. 18 schematically shows a perspective view of a metallic lashing or holding strap, in which a mounting device according to the invention is incorporated for tightening of the lashing or holding strap.
Figure 19:
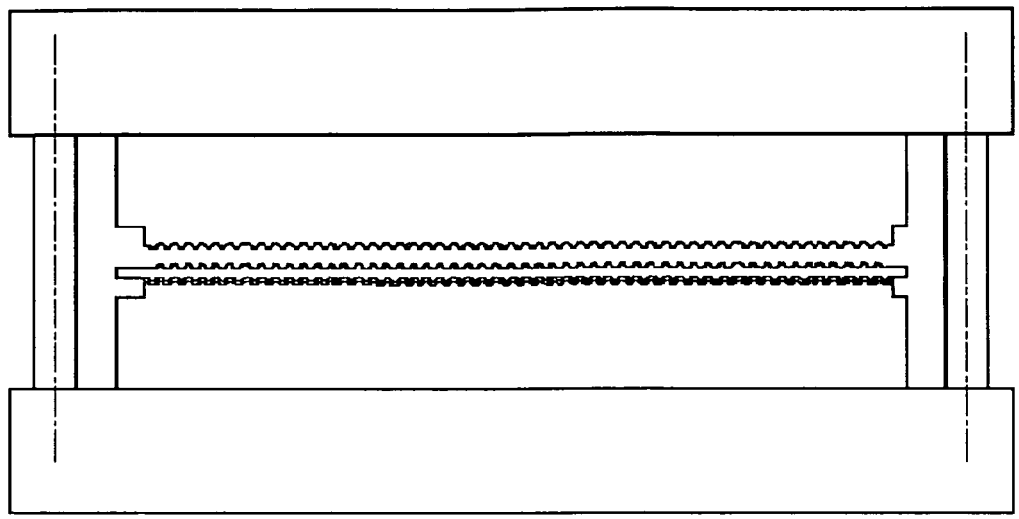
FIG. 19 schematically depicts a side view of a base plate in a press.

FIG. 18 shows a perspective view of a metallic lashing ore holding strap 21. In order to close or tighten the strap 21, there is provided a lug 23 on one end of the strap and a tightening strip 22 on the other end of the strap 21. The tightening strip 22 can be threaded through the lug 23. The mounting device 10 is incorporated into the end portion of the strip 22. After the strip 22 is threaded through the lug 23 it is flipped so that it rests against the outside of the strap 21 in the area of the end of the strap 21 to which the strip 22 is attached. The hook-like projections of the mounting device hook into the surface of the strap 21 and thus fasten it. The mounting device 10 is arranged in a way that it can be disengaged from the surface of the strap 21 and the strap 21 can be unfastened again.

The invention claimed is:

1. A mounting device having a metallic base plate, from which multiple projections project, made by the process of:
   a) cutting multiple hook preforms into the surface of the base plate while leaving at least one bending edge per hook preform; and
   b) manufacturing hook-like projections by bending the hook preforms out of the base plate around the bending edge
   wherein the hook preforms are nested in one another so that a partial area of a hook preform is positioned within another hook preform.

2. The device made by the process of claim 1, further comprising manufacturing lateral protrusions on the projections.

3. The device made by the process of claim 1, further comprising twisting the projections around their longitudinal axis.

4. The mounting device according to claim 1, wherein the lateral protrusions are manufactured by melting a partial area of the projections.

5. The mounting device according to claim 1, wherein the lateral protrusions are manufactured by bending over a partial area of the projections.

6. The mounting device according to claim 1, wherein the hook-like projections project on one side of the base plate.

7. The mounting device according to claim 1, wherein the metallic base plate is made of spring steel.

8. The mounting device according to claim 1, wherein the hook-like projections are arranged essentially uniform and are distributed essentially evenly on the surface of the base plate.

9. The mounting device of claim 1, wherein barbs are arranged on one or both sides on the hook preforms cut into the base plate.

10. The mounting device of claim 1, wherein the hook preforms are arranged as arrow-shaped or mushroom-shaped.

11. The mounting device of claim 1, wherein the hook preforms are as V-shaped.

12. The mounting device of claim 1, wherein the tips of the projections bent out of the hook preforms are bent over.

13. The mounting device of claim 1, wherein the hook-like projections are arranged to engage in a counterpart.

14. The mounting device according to claim 13, wherein the counterpart is arranged as a knitted metal fabric, woven metal fabric, metal braid, or metal scrim.

15. The mounting device according to claim 13, wherein the counterpart is a metal plate having through holes for receiving the hook-like projections.

16. The mounting device according to claim 13, wherein the mounting device and the counterpart have preliminary fixing elements which correspond to one another.

17. The mounting device according to claim 1, wherein the mounting device is attached to a carrier component.

18. The mounting device according to claim 1, wherein the mounting device is integrated in a carrier component.

19. A method for manufacturing a mounting device having a metallic base plate, from which multiple projections project, comprising:
   a) cutting multiple hook preforms into the surface of the base plate while leaving at least one bending edge per hook preform; and
   b) manufacturing hook-like projections by bending the hook preforms out of the base plate around the bending edge;
   wherein the hook preforms are nested in one another so that a partial area of a hook preform is positioned within another hook preform.

20. The method of claim 19, further comprising manufacturing lateral protrusions on the projections.

21. The method according to claim 20, wherein the protrusions are produced by melting the end areas of the projections distal from the base plate using laser radiation.

22. The method of claim 19, further comprising twisting the projections around their longitudinal axis.

23. The method according to claim 19, wherein the hook preforms cut into the base plate are manufactured using a laser beam.

* * * * *